US010666824B2

(12) United States Patent
Hayashi et al.

(10) Patent No.: US 10,666,824 B2
(45) Date of Patent: May 26, 2020

(54) SHEET CONVEYOR

(71) Applicant: Brother Kogyo Kabushiki Kaisha, Nagoya-shi, Aichi-ken (JP)

(72) Inventors: Kakeru Hayashi, Nagoya (JP); Hiroki Kotaka, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/359,422

(22) Filed: Mar. 20, 2019

(65) Prior Publication Data

US 2019/0306354 A1    Oct. 3, 2019

(30) Foreign Application Priority Data

Mar. 28, 2018 (JP) .................. 2018-061993

(51) Int. Cl.
*H04N 1/00* (2006.01)
*B65H 3/06* (2006.01)

(52) U.S. Cl.
CPC ....... *H04N 1/00602* (2013.01); *B65H 3/0669* (2013.01); *H04N 1/00628* (2013.01)

(58) Field of Classification Search
CPC ............ B65H 3/5223; B65H 2403/732; B65H 3/0661; B65H 3/56; B65H 2301/512125; B65H 2403/42; B65H 2403/512; B65H 2403/53; B65H 2405/1136; B65H 3/0669; B65H 3/0684; B65H 3/46; B65H 3/565; B65H 2404/1118; B65H 2407/21; B65H 27/00; B65H 3/5261; H04N 1/00625

USPC .... 271/121, 122, 161, 124, 125, 10.09, 110, 271/114, 116, 117, 145, 19, 265.01, 9.09; 358/498, 474, 496, 497
See application file for complete search history.

(56) References Cited

U.S. PATENT DOCUMENTS

| 5,921,542 | A | * | 7/1999 | Ohno .................. B65H 3/5223 156/714 |
| 8,725,056 | B2 | | 5/2014 | Ichikawa |
| 9,873,579 | B2 | | 1/2018 | Ishida et al. |
| 2005/0046104 | A1 | * | 3/2005 | Suga ....................... B65H 3/48 271/112 |

(Continued)

FOREIGN PATENT DOCUMENTS

| JP | 2010-173785 A | 8/2010 |
| JP | 2011-136793 A | 7/2011 |
| JP | 2017-043433 A | 3/2017 |

*Primary Examiner* — Negussie Worku
(74) *Attorney, Agent, or Firm* — Banner & Witcoff, Ltd.

(57) ABSTRACT

A sheet conveyor includes a feed roller configured to contact a sheet from above and feed the sheet in a sheet feed direction, a frictional member disposed downstream from the feed roller, a separation roller disposed downstream from the feed roller and facing the frictional member from above, and a guide portion located downstream from the feed roller and upstream from the separation roller. The guide portion includes a pointed portion located above a portion of a common tangent to the feed roller and the separation roller when viewed in a cross section that is orthogonal to an axial direction of the feed roller and an axial direction of the separation roller. The pointed portion is located along a width direction of the sheet. The guide portion is configured to guide the sheet fed over the pointed portion toward a nip between the separation roller and the frictional member.

7 Claims, 9 Drawing Sheets

(56) References Cited

U.S. PATENT DOCUMENTS

| | | | |
|---|---|---|---|
| 2008/0110026 A1* | 5/2008 | Marcoe | A01G 20/47 |
| | | | 30/124 |
| 2008/0128972 A1* | 6/2008 | Kishimoto | B65H 3/5215 |
| | | | 271/109 |
| 2008/0265499 A1* | 10/2008 | Sugiyama | B65H 5/062 |
| | | | 271/262 |
| 2009/0214263 A1* | 8/2009 | Kim | G03G 15/08 |
| | | | 399/223 |
| 2010/0118356 A1* | 5/2010 | Sheng | H04N 1/121 |
| | | | 358/483 |
| 2010/0189485 A1 | 7/2010 | Ichikawa | |
| 2010/0328737 A1* | 12/2010 | Shingai | B65H 3/063 |
| | | | 358/498 |
| 2011/0156340 A1 | 6/2011 | Otsuki | |
| 2013/0049289 A1* | 2/2013 | Ichikawa | B65H 1/04 |
| | | | 271/121 |
| 2015/0054217 A1* | 2/2015 | Hirose | B65H 1/04 |
| | | | 271/227 |
| 2015/0274455 A1* | 10/2015 | Ito | B65H 3/52 |
| | | | 271/109 |
| 2017/0057767 A1 | 3/2017 | Ishida et al. | |
| 2017/0320688 A1* | 11/2017 | Nishizawa | B65H 3/0669 |
| 2018/0099828 A1 | 4/2018 | Ishida et al. | |
| 2018/0222705 A1* | 8/2018 | Hirano | B65H 3/5207 |
| 2019/0119059 A1* | 4/2019 | Inui | B65H 1/14 |
| 2019/0127166 A1* | 5/2019 | Ochi | B65H 5/062 |

* cited by examiner

SHEET CONVEYOR

CROSS-REFERENCE TO RELATED APPLICATION

This application claims priority from Japanese Patent Application No. 2018-061993 filed on Mar. 28, 2018, the content of which is incorporated herein by reference in its entirety.

FIELD OF DISCLOSURE

Aspects described herein relate to a sheet conveyor.

BACKGROUND

Sheet conveyors are known to convey a single sheet from a sheet container containing a stack of sheets. When sheets are singly separated and fed from the sheet container, each of their trailing ends collides with a guide surface, and an impact noise occurs.

A known sheet conveyor includes a sheet container configured to accommodate a stack of sheets, a sheet feed roller for feeding a sheet from the sheet container, a separation unit for separating multi-fed sheets one by one to convey a single sheet, and a lower-side guide member having a guide surface and a protrusion. The guide surface is located downstream from the separation unit and guides a sheet passing the separation unit. The protrusion is located opposite to the separation unit to reduce an impact noise, which may occur when a trailing end of a sheet collides with the guide surface. The protrusion is provided only at a central portion of the guide member in a width direction of a sheet.

SUMMARY

However, due to the difference in height, on the guide member, created by the presence or absence of the protrusion in the width direction, a conveyed sheet may be bent in the width direction. The bent sheet may return to its original state with an impact noise.

Illustrative aspects described herein provide a sheet conveyor to reduce an impact noise that may be produced by the trailing end of a sheet.

According to an aspect described herein, a sheet conveyor includes a feed roller configured to contact a sheet from above and feed the sheet in a sheet feed direction, a frictional member disposed downstream from the feed roller in the sheet feed direction, a separation roller disposed downstream from the feed roller in the sheet feed direction and facing the frictional member from above, and a guide portion located downstream from the feed roller and upstream from the separation roller in the sheet feed direction. The guide portion includes a pointed portion located above a portion of a common tangent to the feed roller and the separation roller when viewed in a cross section that is orthogonal to an axial direction of the feed roller and an axial direction of the separation roller. The pointed portion is located along a width direction of the sheet. The guide portion is configured to guide the sheet fed over the pointed portion toward a nip between the separation roller and the frictional member.

When a trailing end of the sheet passes through the pointed portion, it is reliably raised by the pointed portion. Thus, the sheet conveyor conveys the sheet without a collision of the trailing end of the sheet with the guide portion.

DETAILED DESCRIPTION

An illustrative embodiment will be described with reference to the accompany drawings.

Laser Printer

Figure 1:
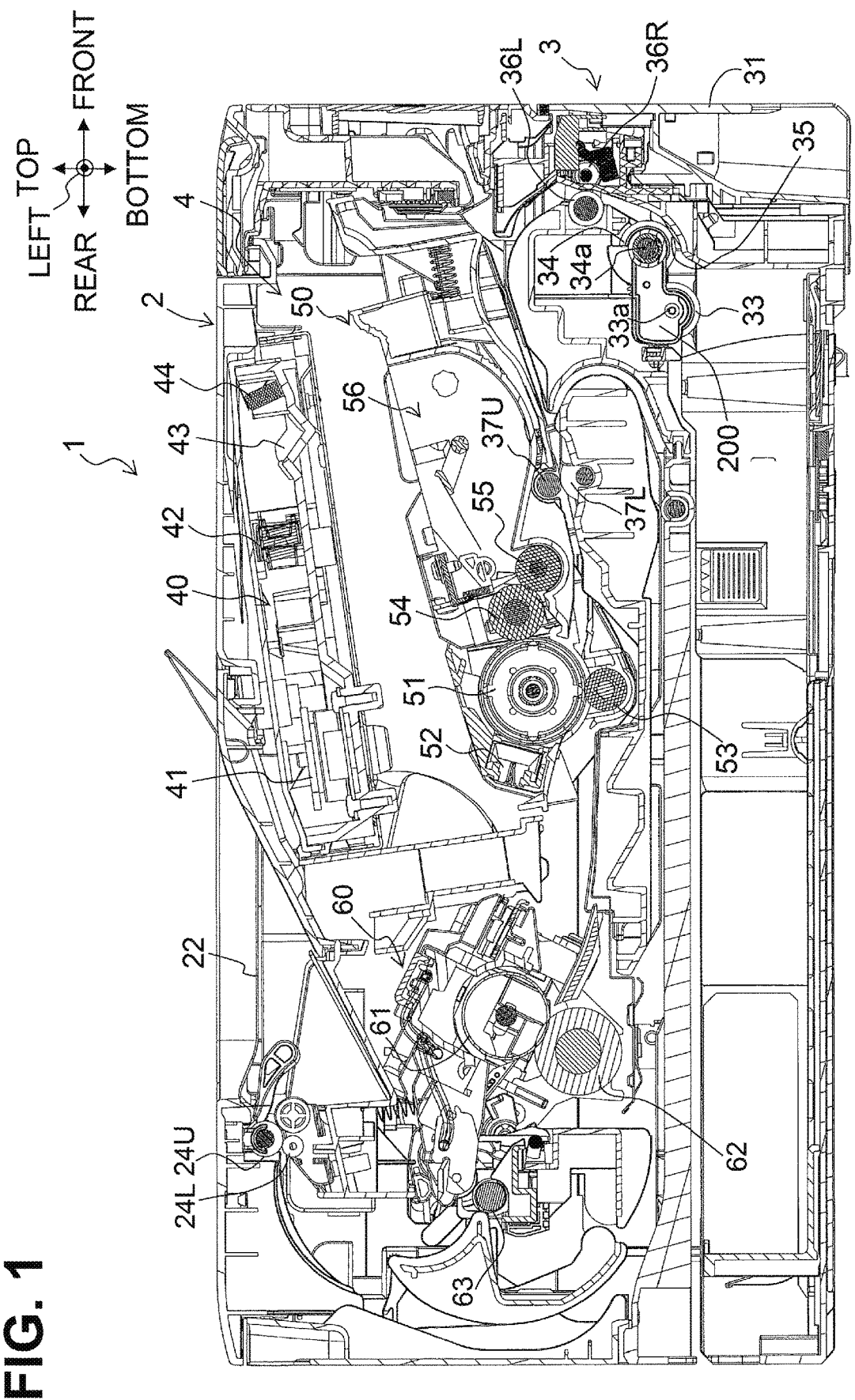
FIG. 1 is a cross sectional view of a laser printer including a sheet conveyor according to an illustrative embodiment described herein.

An overall structure of a laser printer 1 including a sheet conveyor according to an illustrative embodiment will be described with reference to FIGS. 1-3. In the following description, directions are defined from the viewpoints of users standing in front of the laser printer 1. In FIG. 1, a right side is defined as a front or front side of the laser printer 1, a left side is defined as a rear or rear side of the laser printer 1, a side facing out of the page is defined as a left or left side of the laser printer 1, a side facing into the page is defined as a right or right side of the laser printer 1, an upper side is defined as a top or upper side of the laser printer 1, and a lower side is defined as a bottom or lower side of the laser printer 1.

Figure 2:
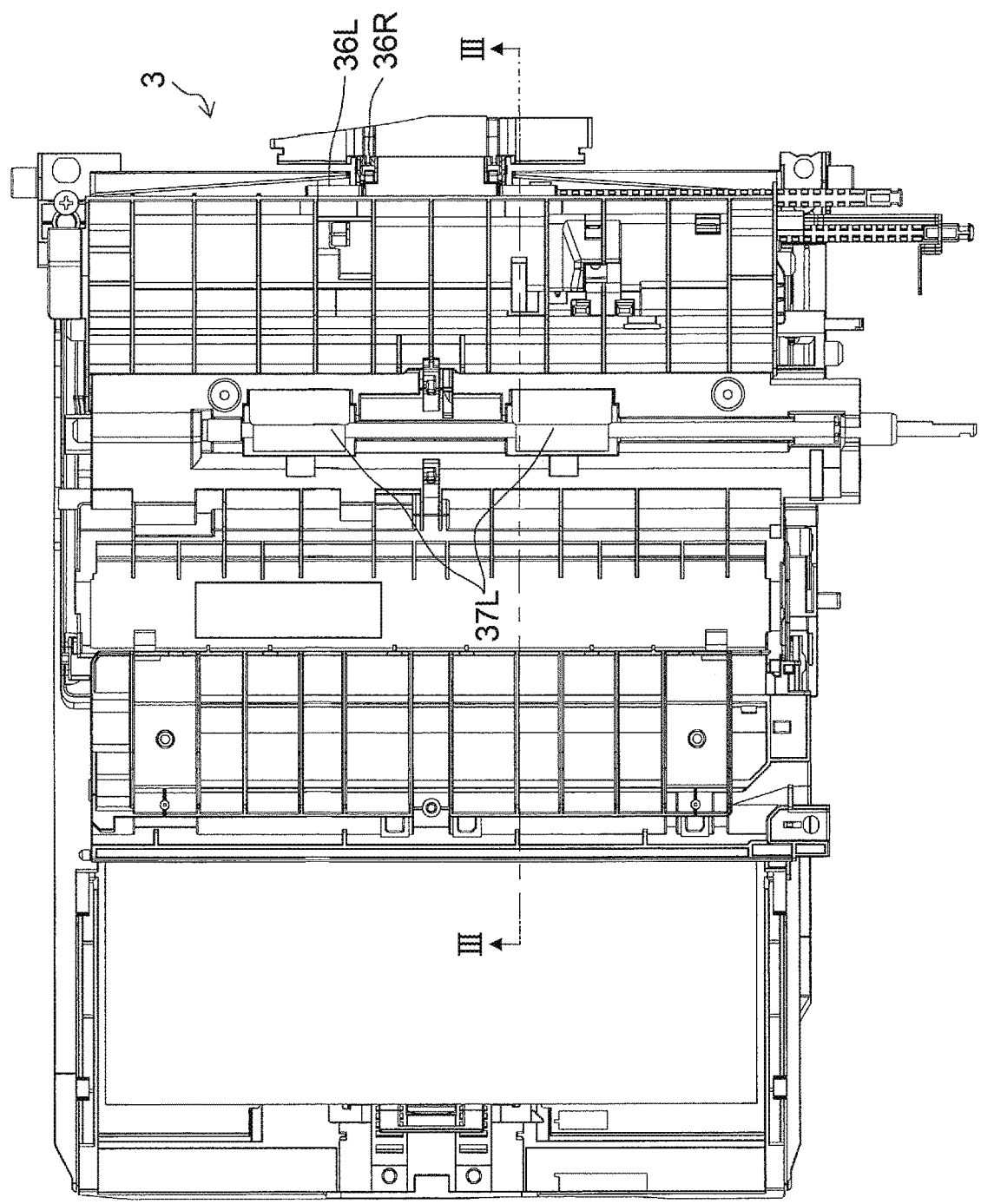
FIG. 2 is a top view of the sheet conveyor.
Figure 3:
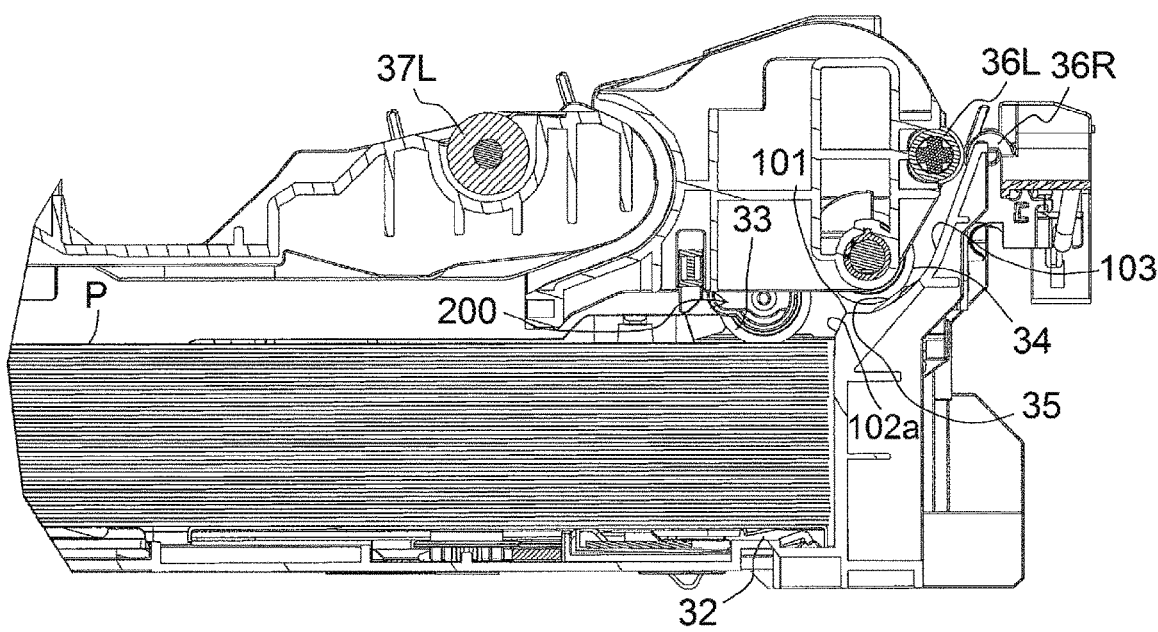
FIG. 3 is a cross sectional view taken along line III-III of FIG. 2.

As illustrated in FIGS. 1-3, the laser printer 1 includes a main body casing 2, a conveyor 3 configured to feed and a convey a sheet of paper P (hereinafter referred to as a sheet P), and an image forming unit 4 configured to form an image on the sheet conveyed by the conveyor 3. The laser printer 1 is an example of a sheet conveyor.

Conveyor

The conveyor 3 is disposed in a lower portion of the laser printer 1 and configured to separate sheets P one by one and feed a single sheet P to the image forming unit 4. The conveyor 3 includes a sheet accommodation tray 31 for accommodating a stack of sheets P, a feed roller 33, a separation roller 34, a separation pad unit 35, a pair of conveying rollers 36L, 36R, and a pair of registration rollers 37U, 37L. The sheet accommodation tray 31 is movable in and out of the main body casing 2. In the following description, a direction in which a sheet P is fed from the sheet accommodation tray 31 toward the image forming unit 4 is referred to as just "a sheet feed direction". "Upstream in the sheet feed direction" is referred to as just "upstream," "downstream in the sheet feed direction" is referred to as just "downstream," and a width direction of sheets P accommodated in the sheet accommodation tray 31 is referred to as just "a width direction".

The feed roller 33 is configured to feed a sheet P accommodated in the sheet accommodation tray 31 toward the separation roller 34 and the separation pad unit 35 (a friction sheet 520). The feed roller 33 is disposed at a central portion in a width direction of the main body casing 2.

The separation roller 34 is configured to apply a conveying force to a sheet P. The separation roller 34 is disposed in front of, or downstream from the feed roller 33, at the central portion in the width direction of the main body casing 2. The feed roller 34 and the separation roller 33 are rotatable by a driving force from a motor (not illustrated) to feed a sheet P. The feed roller 34 and the separation roller 33 are supported by a roller holder 200. The roller holder 200 supports the separation roller 34 such that the separation roller 34 is rotatable about an axis 34*a* extending horizontally in the left-right direction. The roller holder 200 supports the feed roller 33 such that the feed roller 33 is rotatable about an axis 33*a* extending horizontally in the left-right direction. The roller holder 200 is an example of a holder.

Figure 4:
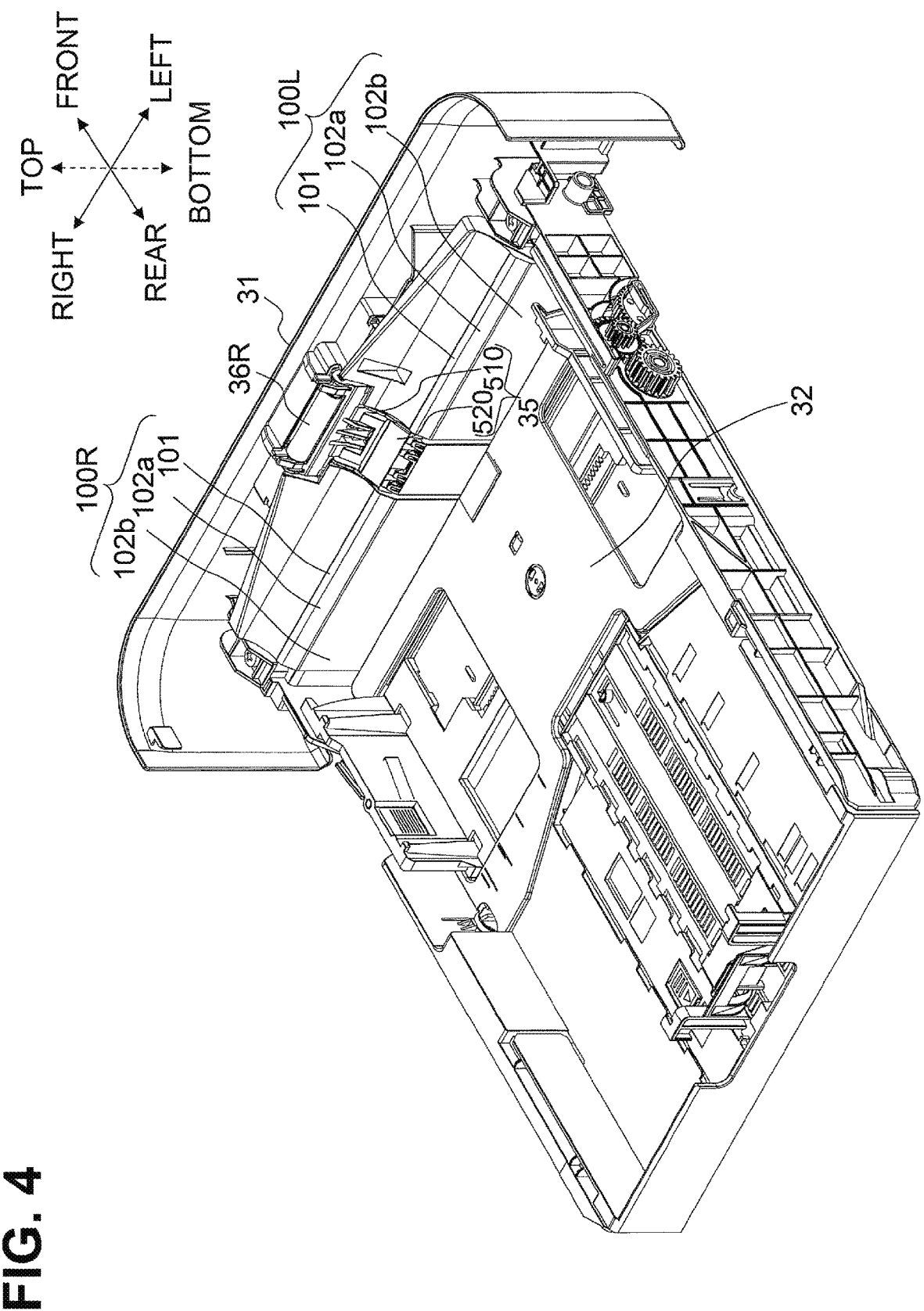
FIG. 4 is a perspective view of a sheet accommodation tray.
Figure 6:
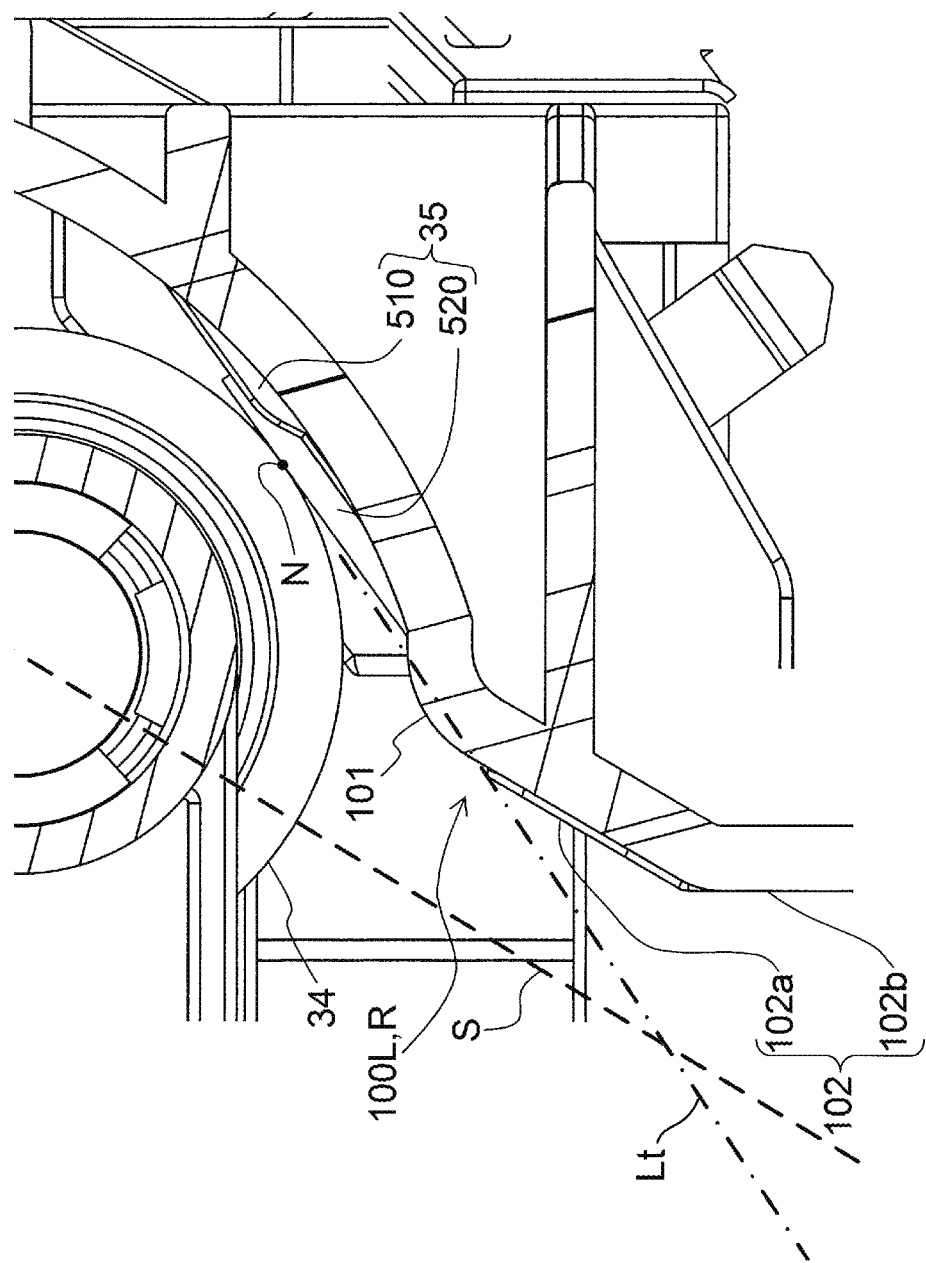
FIG. 6 is a partially enlarged view of FIG. 5, illustrating a detailed structure of a guide portion.

The separation pad unit 35 is disposed at a central portion of a front portion of the sheet accommodation tray 31 and downstream from the feed roller 33. The separation pad unit 35 is movable toward and away from the separation roller 34. As illustrated in FIGS. 4 and 6, the separation pad unit 35 includes a holder 510 and a friction sheet 520 located opposite to the separation roller 34 from below. The separation pad unit 35 and the separation roller 34 are configured to separate sheets P one by one therebetween. The friction sheet 520 is made from a material having high coefficient of friction, such as rubber or cork. The friction sheet 520 is attached (e.g., affixed) to a recession of the holder 510. The friction sheet 520 attached to the holder 510 is urged toward the separation roller 34, and the upper surface of the friction sheet 520 and the separation roller 34 separate a single sheet P therebetween. The friction sheet 520 of the separation pad unit 35 is an example of a friction member.

Referring back to FIGS. 1-3, the sheet accommodation tray 31 is shaped like an open topped box. The sheet accommodation tray 31 includes a sheet supporting plate 32 configured to support one or more sheets P. The sheet accommodation tray 31 is detachable from the main body casing 2. The sheet supporting plate 32 is an example of a sheet supporting portion.

In the conveyor 3, the sheet supporting plate 32 urges sheets P accommodated in the sheet accommodation tray 31 toward the feed roller 33. The feed roller 33 contacts an uppermost sheet P supported on the sheet supporting plate 32 to feed the sheet P downstream toward the separation pad unit 35. The separation roller 34 and the separation pad unit 35 separate the fed sheet P from subsequent sheets P, and the conveying rollers 36L, 36R and the registration rollers 37L, 37R convey the single sheet P toward the image forming unit 4.

Image Forming Unit

The image forming unit 4 includes an exposure device 40, a process cartridge 50, and a fixing device 60.

The exposure device 40 is disposed in an upper portion of the main body casing 2 and includes a laser emitting portion, not illustrated, a polygon mirror 41, lenses 42, 43, and a reflecting mirror 44.

The process cartridge 50 is disposed below the exposure device 40 and is replaceable through an opening formed when a front cover attached to the main body casing 2 is open. The process cartridge 50 includes a photosensitive drum 51, a charger 52, a transfer roller 53, a developing roller 54, a supply roller 55, and a toner accommodating portion 56 configured to accommodate developer, for example, toner.

The fixing device 60 is disposed at the rear of the process cartridge 50 and includes a heat roller 61 and a pressure roller 62 pressing the heat roller 61.

The image forming unit 4 uses a laser emitted from the laser emitting portion based on image data, which is reflected by or passes through the polygon mirror 41, the lens 42, the reflecting mirror 44, and the lens 43 in this order, to scan at high speed a surface of the photosensitive drum 51. The surface of the photosensitive drum 51, which is positively and uniformly pre-charged by the charger 52, is exposed to the laser at high speed, thus having an electrostatic latent image formed thereon. The supply roller 55 supplies toner in the toner accommodating portion 56 to the developing roller 54, and the developing roller 54 thus carries toner thereon. Toner carried on the developing roller 54 is supplied to the electrostatic latent image on the surface of the photosensitive drum 51, thereby forming a visible toner image corresponding to the electrostatic latent image on the photosensitive drum 51. While a sheet P supplied from the conveyor 3 is conveyed between the photosensitive drum 51 and the transfer roller 53, the toner image on the photosensitive drum 51 is transferred onto the sheet P.

The sheet P having the toner image transferred thereon is nipped and conveyed between the heat roller 61 and the pressure roller 62, thereby thermally fixing the toner image onto the sheet P. The sheet P having the toner image thermally fixed thereon is conveyed downstream by a conveying roller 63, and discharged by discharge rollers 24L, 24U to a discharge tray 22.

Guide Portions

One of the features of the laser printer 1 of the embodiment is a structure of the conveyor 3 to guide a sheet P fed in the sheet feed direction. The structure will be described in detail with reference to FIGS. 3, 4, 5, and 6.

Figure 5:
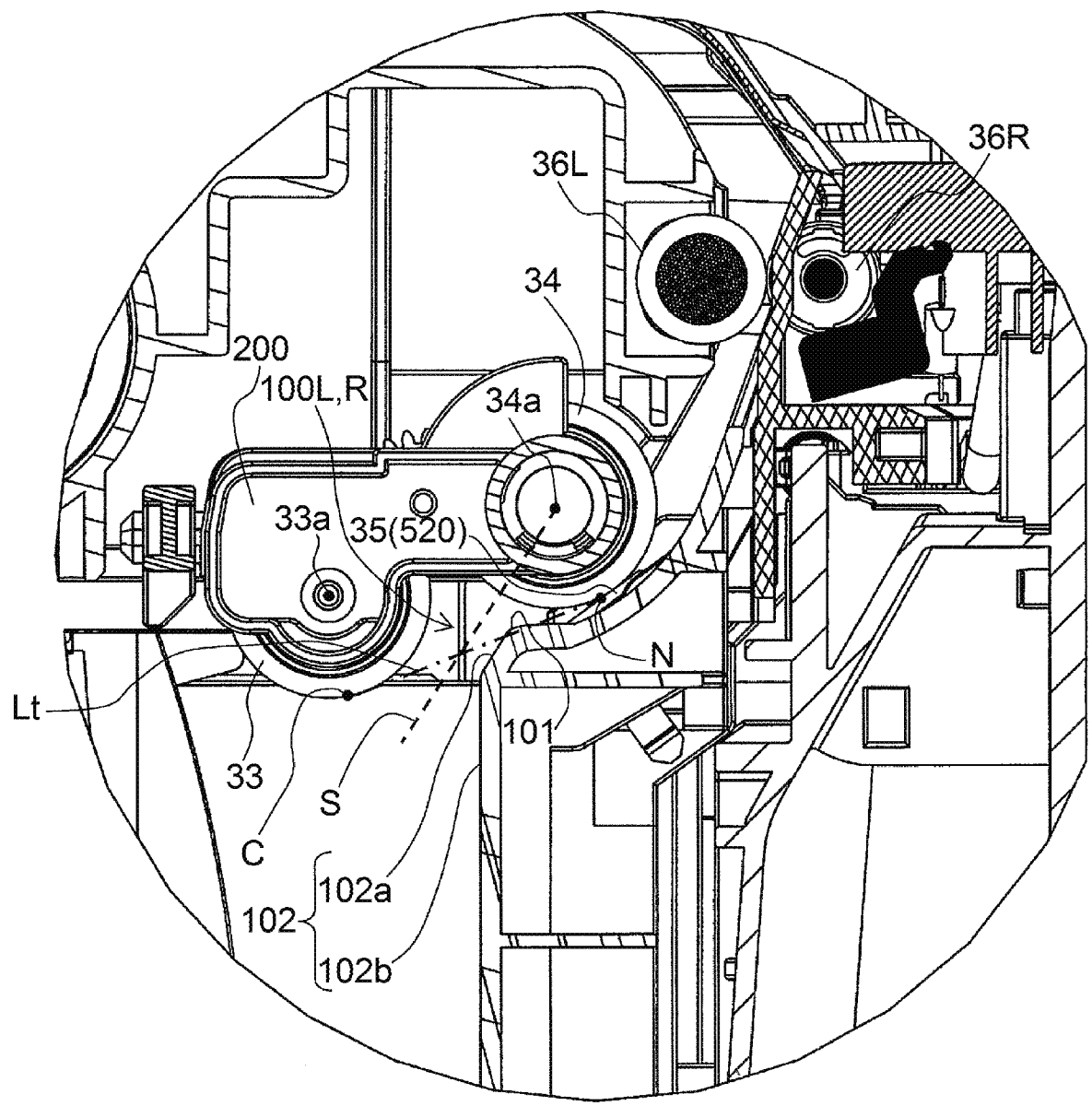
FIG. 5 is a partially enlarged view of FIG. 1, illustrating a detailed structure around a feed roller and a separation roller.

As illustrated in FIGS. 4-6, guide portions 100L, 100R are located downstream from the feed roller 33 and upstream from the separation roller 34 in the sheet feed direction. The guide portions 100L, 100R are configured to guide a sheet P toward the separation roller 34 and the friction sheet 520. The guide portion 100L and the guide portion 100R are located opposite to each other across the separation pad unit 35, which is located in the central portion in the width direction. Specifically, the guide portion 100L is located to the left of the separation pad unit 35, and the guide portion 100R is located to the right of the separation pad unit 35. The guide portions 100L, 100R are identical in structure and shape, and thus generically referred to as "a guide portion 100" in the following description.

As illustrated in FIGS. 3, 5, and 6, the guide portion 100 includes a pointed portion 101 located along the width direction and a guide surface portion 102 located upstream from the pointed portion 101. The guide portion 100 is configured to guide a sheet P fed over the pointed portion 101 toward a nip N between the separation roller 34 and the friction sheet 520.

Pointed Portion

FIG. 6 is a cross sectional view of the guide portion 100 taken along the front-rear direction. The pointed portion 101 is illustrated as having a curved shape. As illustrated in FIG. 4, the curved shape is entirely continuous along the width direction of a sheet P.

Positional Relationship Between Pointed Portion and Common Tangent

As illustrated in FIG. 5, the pointed portion 101 is located above a portion of a common tangent Lt passing through a point C and the nip N. The point C is on a lower portion of the outer peripheral surface of the feed roller 33. The nip N is a point of contact between a lower portion of the outer peripheral surface of the separation roller 34 and the friction sheet 520. This positional relationship will be described in detail with reference to FIG. 7.

Figure 7A:
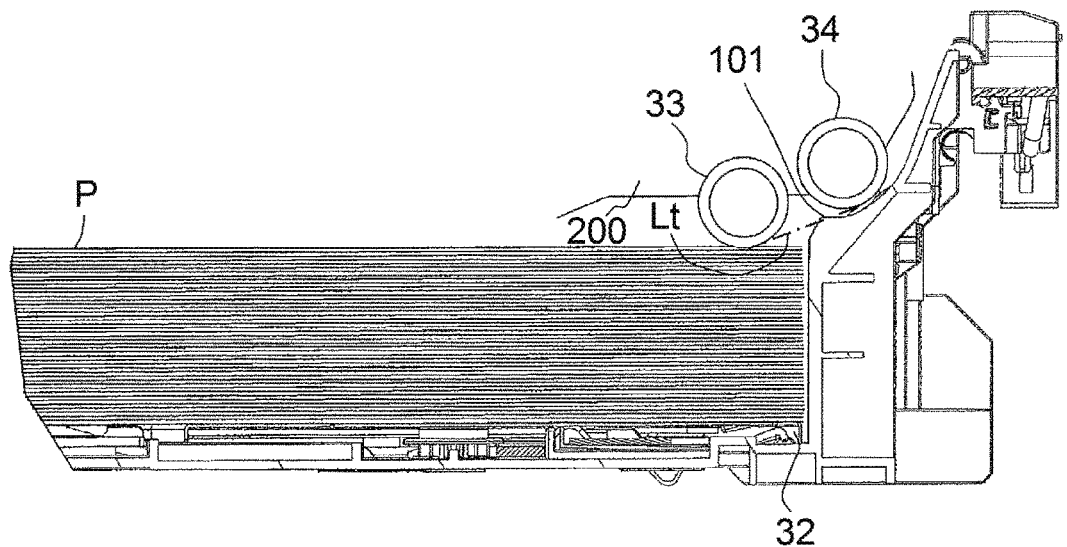
FIGS. 7A and 7B each illustrate a positional relationship between a pointed portion and a common tangent to the feed roller and the separation roller.

The conveyor 3 includes a position adjustment mechanism, not illustrated, for automatically adjusting the position of the sheet supporting plate 32. Before sheet feeding starts, the position adjustment mechanism raises the sheet supporting plate 32 supporting one or more sheets thereon to an initial position that an uppermost sheet P is subjected to a predetermined pressing force from the feed roller 33. When the sheet supporting plate 32 is at the initial position, the feed roller 33 is also at its initial position. FIG. 7A illustrates an example of the initial positions.

When the sheet supporting plate 32 is at the initial position, the more the sheets P in the sheet accommodation tray 31 are conveyed sequentially one after another, the further the position of the feed roller 33 in contact with an uppermost sheet P commensurately lowers relative to the separation roller 34. When the feed roller 33 lowers to a predetermined lower limit position illustrated in FIG. 7B, a detection mechanism, not illustrated, detects the feed roller 33 reaching the lower limit position. In response to the detection, the position adjustment mechanism raises the sheet supporting plate 32 again to the initial position, thus raising the feed roller 33 and the separation roller 34 to their initial positions. Then, the above process is repeated: the feed roller 33 gradually lowers as the sheets P are conveyed sequentially one after another; the detection mechanism detects the feed roller 33 reaching the lower limit position; and the feed roller 33 is raised to the initial positions.

Figure 7B:
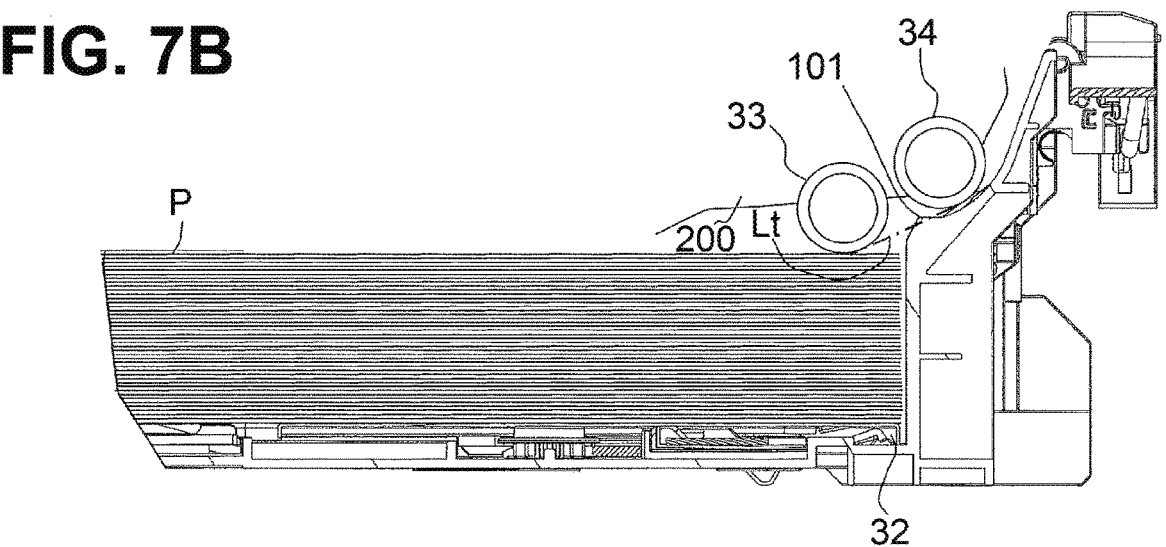

While the laser printer 1 is in use, the position of the feed roller 33 is changeable in height in a range between the initial position illustrated in FIG. 7A and the lower limit position illustrated in FIG. 7B. In either case, whether the feed roller 33 is at the initial position illustrated in FIG. 7A or the lower limit position illustrated in FIG. 7B, the pointed portion 101 is located above a portion of the common tangent Lt to both the feed roller 33 and the separation roller 34.

Guide Surface Portion

Referring back to FIGS. 3, 4, 5, and 6, the guide surface portion 102 extends along the width direction and includes a guide surface 102a configured to guide a sheet P toward the pointed portion 101, and a vertical surface 102b located upstream from the guide surface 102a. The guide surface 102a is located opposite to the feed roller 33 relative to a plane S, which passes through an axis 34a of the separation roller 34 and extends parallel to the guide surface 102a. The separation roller 34 is disposed at a position to press down a leading end of a sheet P guided by the guide surface 102a.

Guide Surface of Roller Holder

Figure 8:
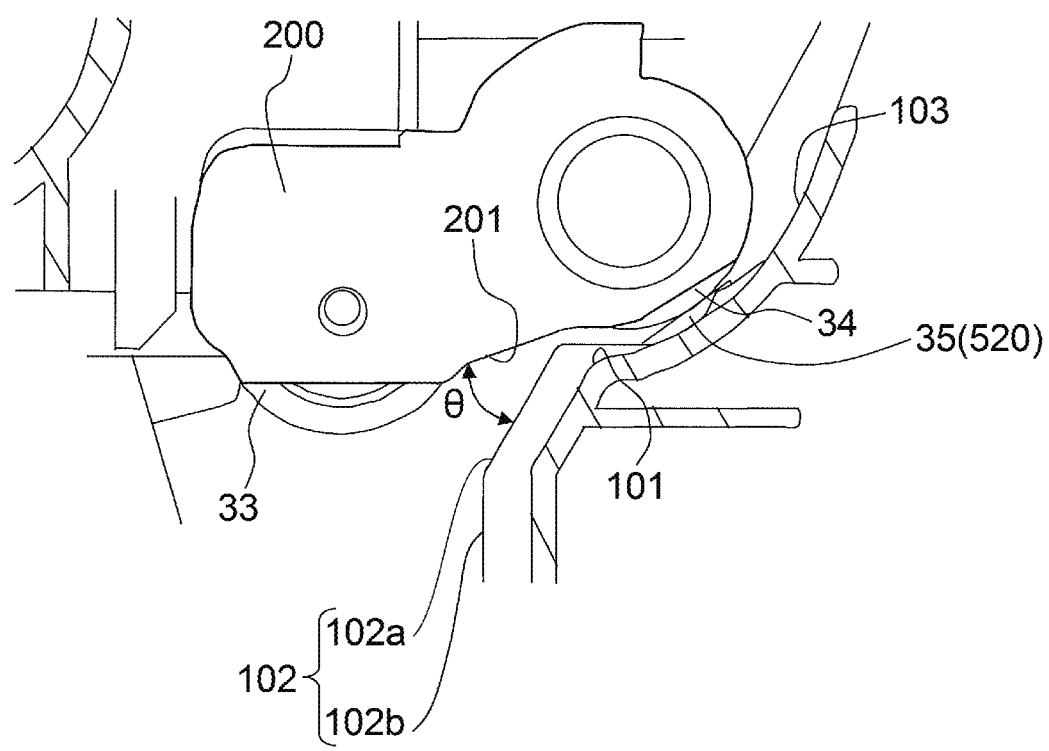
FIG. 8 is a cross sectional view of a roller holder with a guide surface.

The roller holder 200 has a guide surface 201 on a lower side of the roller holder 200 as illustrated in FIG. 8. The guide surface 201 may be provided at any position except for a central portion, in the width direction, of the roller holder 200 where the feed roller 33 and the separation roller 34 are supported. In FIG. 8, the guide surface 201 is configured to guide a sheet P downward such that the sheet P is fed downstream over the pointed portion 101. The guide surface 201 of the roller holder 200 and the guide surface 102a of the guide surface portion 102 form an angle θ. The angle θ may be smaller than 45 degrees. The guide surface 201 is an example of an upper guide surface.

Effects of Embodiment

The following will describe effects of the above described embodiment using a comparison example.

In the laser printer 1 of the embodiment described with reference to FIG. 5, the guide 100 for guiding a sheet P toward the nip N between the separation roller 34 and the friction sheet 520 of the separation pad unit 35 includes the pointed portion 101.

Figure 9:
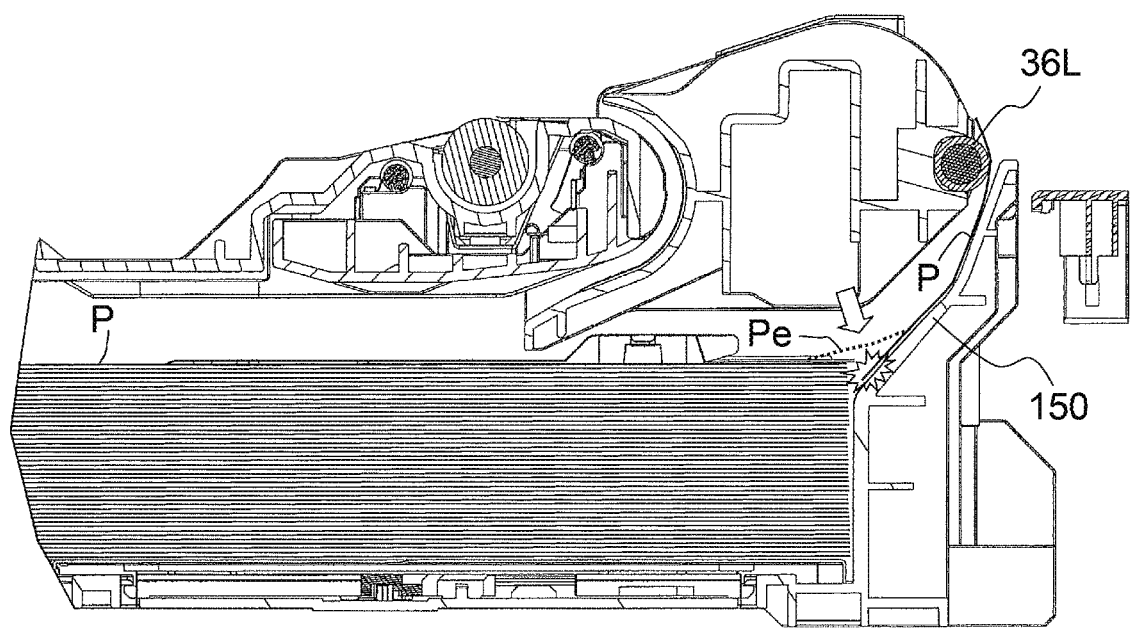
FIG. 9 illustrates an example sheet conveyor without a guide portion, illustrating a collision of a sheet.

In a comparison example illustrated in FIG. 9, a guide 150 is devoid of such a pointed portion. In the comparison example, when a sheet P is fed downstream from the sheet accommodation tray 31 and its trailing end Pe is separated from an uppermost sheet remaining in the sheet accommodation tray 31, the sheet P bent along the wall surface of the guide portion 150 is released, and the trailing end Pe collides with the wall surface of the guide portion 150 with an impact noise as illustrated.

This embodiment, however, provides the pointed portion 101 located above a portion of the common tangent Lt to both the feed roller 33 and the separation roller 34. When the feed roller 33 feeds a sheet P, the leading end of the sheet P contacts the pointed portion 101. The leading end of the sheet P moves over the pointed portion 101, and then is guided toward the nip N between the separation roller 34 and the friction sheet 520 of the separation pad unit 35. When the trailing end of the sheet P passes through the pointed portion 101, it is reliably raised by the pointed portion 101. Thus, the embodiment enables smooth conveyance of a sheet P without such a collision of the leading end Pe of the sheet P with the guide portion 150 as in the above comparison example.

As described above using FIG. 4, the pointed portion 101 of the guide portion 100 extends entirely along the width direction of a sheet P. This reduces the likelihood that a conveyed sheet P may be bent in the width direction, which would cause an impact noise to occur when a bent sheet P returns to its original state in a known structure where a protrusion is provided only at a center of a guide portion in the width direction of a sheet P. This reduces an impact noise.

In the embodiment, the leading end of a sheet P fed by the feed roller 33 contacts the guide surface 102a, which guides the leading end toward the pointed portion 101. The guide surface 102a is located upstream from the pointed portion 101 and extends along the width direction. The guide surface 102a is located opposite to the feed roller 33 relative to the plane S, which passes through the axis 34a of the separation roller 34. The separation roller 34 is disposed at a position to press down a leading end of a sheet P guided by the guide surface 102a. When moving over the pointed portion 101, the leading end of the sheet P guided by the guide surface 102a is pressed down by the separation roller 34 to be reliably conveyed to the nip point N.

In this embodiment, the pointed portion 101 has a curved shape in cross section as illustrated in FIG. 6, and the curved shape in cross section extends along the width direction of a sheet P as illustrated in FIG. 4. This shape prevents the concentration of stress on a part of a leading end of a sheet P being guided, which may cause the leading end of the sheet P to bend or be deformed. This reduces resistance to a sheet P to be conveyed.

The embodiment provides the guide surface 201 in addition to the guide portion 100. The guide surface 201 is provided on the roller holder 200, which supports the feed roller 33 and the separation roller 34 rotatably. The guide surface 201 is configured to guide, downward, a sheet P moving over the pointed portion 101. Thus, the guide surface 201 and the guide portion 100 guide the sheet P both from above and from below.

The embodiment shows that the guide surface 201 of the roller holder 200 and the guide surface 102a of the guide surface portion 100 form an angle θ smaller than 45 degrees when viewed in a cross section as illustrated in FIG. 8.

Thus, a space for guiding a sheet P between the guide surface 201 and the guide surface 102a is narrower the more downstream it is. This prevents jamming of sheets in their leading ends.

The above embodiment is merely an example. Various changes, arrangements and modifications may be applied therein without departing from the spirit and scope described herein.

The above embodiment shows but is not limited to that, as illustrated in FIG. 4, the curved shape in cross section of the pointed portion 101 of the guide portion 100 is continuous along the width direction of a sheet P. In some embodiments, the pointed portion 101 of the guide portion 100 may have separate pieces, which have each a curved shape in cross section, and are intermittently located along the width direction of a sheet P.

The above embodiment shows that the sheet accommodation tray 31 is movable in and out of the main body casing 2. In some embodiments, the sheet accommodation tray 31 may be immovable relative to the main body casing 2.

The sheets P may include sheets of plain paper, postcards, transparencies, or other materials.

The above embodiment shows but is not limited to the laser printer 1 illustrated as an example of a sheet conveyor. For example, the sheet conveyor may be any of other image forming apparatuses such as a color printer, a copying machine and a multifunction printer. The embodiments described herein are applicable to not only the image forming apparatus but also other apparatuses (e.g., a sheet feeder) configured to separate and feed a single sheet from a stack of sheets.

In the above descriptions, words "vertical," "vertically," and "parallel," do not have their precise meanings. In other words, those words have manufacturing tolerances: "vertical" or "vertically" means "substantially vertical" or "substantially vertically," "parallel" means "substantially parallel," and "plane" means "substantially plane".

In the above descriptions, a word "identical" does not have its precise meaning. In other words, the word has manufacturing tolerances: "identical" means "substantially identical".

What is claimed is:

1. A sheet conveyor, comprising:
   a feed roller configured to contact a sheet from above and feed the sheet in a sheet feed direction;
   a friction sheet disposed downstream from the feed roller in the sheet feed direction;
   a separation roller disposed downstream from the feed roller in the sheet feed direction and facing the friction sheet from above; and
   a guide portion located downstream from the feed roller and upstream from the separation roller in the sheet feed direction, the guide portion including a pointed portion located above a portion of a common tangent to the feed roller and the separation roller when viewed in a cross section that is orthogonal to an axial direction of the feed roller and an axial direction of the separation roller, the pointed portion being located along a width direction of the sheet, wherein the guide portion is configured to guide the sheet fed over the pointed portion toward a nip between the separation roller and the friction sheet.

2. The sheet conveyor according to claim 1,
   wherein the guide portion has a guide surface, the guide surface being located upstream from the pointed portion and extending along the width direction, the guide surface being configured to guide the sheet toward the pointed portion, the guide surface being located, when viewed in the cross section, opposite to the feed roller relative to a plane, which passes through an axis of the separation roller, and
   wherein the separation roller is disposed at a position to press down a leading end of the sheet guided by the guide surface.

3. The sheet conveyor according to claim 2, wherein the pointed portion has a curved shape when viewed in the cross section.

4. The sheet conveyor according to claim 2, further comprising a holder supporting the feed roller and the separation roller such that the feed roller and the separation roller are rotatable about respective axes,
   wherein the holder has a guide surface configured to guide the sheet downward such that the sheet is fed over the pointed portion.

5. The sheet conveyor according to claim 4, wherein the guide surface of the holder and the guide surface of the guide portion form an angle smaller than 45 degrees when viewed in the cross section.

6. The sheet conveyor according to claim 1, wherein the pointed portion of the guide portion extends entirely along the width direction.

7. The sheet conveyor according to claim 1, wherein the guide portion is located adjacent to the friction sheet in the width direction.

* * * * *